UNITED STATES PATENT OFFICE.

CARL W. MAXON, OF BAY CITY, MICHIGAN.

ALLOY FOR SOLDERING OR BRAZING.

SPECIFICATION forming part of Letters Patent No. 532,890, dated January 22, 1895.

Application filed November 7, 1894. Serial No. 528,126. (No specimens.)

*To all whom it may concern:*

Be it known that I, CARL W. MAXON, a citizen of the United States, residing at Bay City, in the county of Bay and State of Michigan, have invented certain new and useful Improvements in Alloys for Soldering or Brazing, of which the following is a specification.

This invention relates to improvements in alloys for soldering or brazing and pertains especially to an alloy of metals to form a suitable composition for soldering or brazing aluminum.

The invention consists in a composition of several metals united together as I shall hereinafter particularly describe and which will also be set forth in the claim of this specification.

The object of my invention is to provide an alloy or composition of metals, which, when subjected to a proper heat will fuse and unite with the surfaces of aluminum metal, and which can be used with sufficient heat in the same manner as ordinary solders upon other metals. In order to attain this object I take copper, four parts; silver, three parts; phosphorus, three parts; aluminum, three parts; zinc, five parts; lead, twelve parts; tin, thirty parts, and melt the whole in a crucible and cast into ingots or bars. The solder is then used with a blow pipe for imparting a high heat to the work and for melting the solder, and after the solder is melted upon the work it is moved and stirred about with a light tool held with the blow pipe flame impinged upon the tool and the work and the solder then unites with the surfaces of the work, and on cooling forms a firm and solid joint and has the natural bright color of aluminum which it retains without oxidizing or corrosion.

Having described my invention, what I claim as new, and desire to secure by Letters Patent, is—

A solder for aluminum composed of copper, silver, phosphorus, aluminum, zinc, lead and tin melted together, substantially in the proportions specified.

In testimony whereof I affix my signature in the presence of two witnesses.

CARL W. MAXON.

Witnesses:
GEO. P. THOMAS,
F. A. McKAY.